United States Patent Office 3,236,855
Patented Feb. 22, 1966

3,236,855
CERTAIN N - PHENYL(THIAZOLE - HYDROXAMI-
DINE) COMPOUNDS AND THEIR PREPARATION
Robert E. Jones, North Muskegon, Mich., and George
Gal, Summit, N.J., assignors to Merck & Co., Inc., Rahway, N.J., a corporation of New Jersey
No Drawing. Filed Apr. 2, 1965, Ser. No. 445,230
8 Claims. (Cl. 260—302)

This is a continuation-in-part of application Serial No. 124,772, filed July 18, 1961.

This invention is concerned generally with a method of preparing N-phenylhydroxyamidines. More specifically, it relates to a method for making N-phenylhydroxyamidines substituted with a five-membered nitrogen- and sulfur-containing heterocyclic ring. It is concerned further with the novel chemical substances obtained in this process.

According to the instant invention, it has now been found that N-phenylamidines substituted with a 5-membered heterocyclic ring containing nitrogen and sulfur, and which may further be substituted at the 3- and/or 4-position, may be treated with hydroxylamine to produce an N-phenylhydroxyamidine derivative thereof. This process may be pictured structurally as follows:

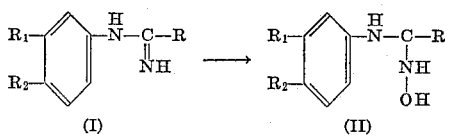

In the structures shown above, R represents a five-membered heterocyclic ring containing nitrogen and sulfur as the hetero atoms, $R_1$ and $R_2$ represent hydrogen, lower alkyl, lower alkoxy, phenoxy, lower alkylthio, phenylthio, halo, phenyl, halophenyl and thienyl. The five-membered heterocyclic radical R which is attached to the carbon atom of the amidine radical in Formulas I and II through one of its carbon atoms may be a thiazolyl, isothiazolyl or thiadiazolyl radical. When R is thiazolyl or isothiazolyl the point of attachment to the carbon atom of the amidine radical may be through any one of the three carbon atoms of the heterocyclic ring. When R is a thiadiazolyl group containing two nitrogen and one sulfur atoms in the ring, the point of attachment may be in either of the two carbon atoms in a 1,2,3-thiadiazole or a 1,2,4-thiadiazole. With the symmetrical 1,2,5-thiadiazoles, only one point of attachment, of course, exists. The heterocyclic radical R may be further substituted at one of its carbon atoms, such as with a lower alkyl or halo radical, the only limitation being that imposed by the availability of the particular thiazoles, isothiazoles or thiadiazole compounds which are employed in synthesizing the N-phenylamidine of Formula I.

Also within the purview of this invention are those compounds wherein the phenyl radical of Formulas I and II above are further substituted at the 3- and/or 4-positions of the N-phenyl radical. Accordingly $R_1$ and $R_2$ may be hydrogen or halo, for example, chlorine or fluorine. One of $R_1$ and $R_2$ may be alkyl, preferably loweralkyl such as methyl, ethyl, isopropyl and the like, phenyl, or a halophenyl group having a halo radical, for example fluoro or chloro, located ortho, meta or para with respect to the phenyl carbon linking the halophenyl group to the benzimidazole moiety. Examples of such halophenyl groups include p-fluorophenyl, p-chlorophenyl, o-fluorophenyl, m-fluorophenyl, and the like. $R_1$ and $R_2$, but not both at any one time, also represent a heterocyclic radical such as thienyl and the like, a loweralkoxy or loweralkylthio group such as methoxy, ethoxy, methylthio, propylthio and the like, or a phenoxy or phenylthio group.

The N-phenylamidines of Formula I are prepared by intimately contacting a cyano derivative of the heterocyclic compound with aniline in the presence of a Friedel-Crafts type catalyst such as aluminum chloride, ferric chloride, zinc chloride, stannous chloride, aluminum bromide, zinc bromide and the like. The reaction is conducted at temperatures in the range of 100–200° C. for a relatively short period of time, i.e., reaction periods of less than 2 hours are satisfactory. The reaction product is recovered as an acid addition salt, the particular salt corresponding to the catalyst employed. Thus, when the catalyst is a chloride, a hydrochloride salt is produced. If the Friedel-Crafts catalyst is a bromide salt, the amidine reaction product exists as the hydrobromide. In this way aniline and 4-cyanothiazole are reacted to produce N-phenyl(thiazole - 4 - amidine) hydrohalide. When the aniline compound contains one of the earlier mentioned substituents at the 2- or 3-position, this substituent survives the reaction and the N-phenylamidine is correspondingly substituted.

In accordance with one aspect of the present invention, the N-phenylamidines of Formula I hereinabove are converted to the corresponding hydroxyamidines of Formula II by reaction with hydroxylamine. This conversion is brought about by intimately contacting the two reactants in a suitable solvent medium. Particularly satisfactory as solvents are water and a water miscible solvent such as alkanols, preferably lower alkanols such as ethanol, propanol, isopropanol and the like, and ethers, for example diethyleneglycol dimethyl ether, ethyleneglycol dimethyl ether, tetrahydrofuran, dioxan and the like. It is preferred to employ a slight molar excess of the hydroxylamine for optimum results. The reaction should be carried out at a pH of 7–10 and preferably at a pH of 7–8. A sufficient amount of a base such as sodium carbonate, sodium bicarbonate or potassium carbonate is accordingly added in order to neutralize any free acid present in the reaction mixture. Formation of the hydroxyamidine is preferably carried out at elevated temperatures of from 75–150° C. for periods of from about 5 to about 60 minutes. The desired product may then be recovered by methods known to those skilled in the art. Since the N-phenylamidines of Formula I are normally obtained as the hydrohalides, they are conveniently reacted with hydroxylamine in this form to obtain the hydroxyamidine derivatives.

The hydroxyamidine of Formula II may be converted to a 2-substituted benzimidazole by treatment with an alkyl or aryl sulfonyl halide in the presence of a base such as pyridine or triethylamine and under anhydrous conditions. Suitable sulfonyl halides that may be employed are methane sulfonyl chloride, methane sulfonyl bromide, p-toluene sulfonyl chloride, p-toluene sulfonyl bromide and the like. Thus, by reacting N-phenyl(thiazole-4-hydroxy-amidine) with methane sulfonyl chloride in the presence of a small amount pyridine, there is produced 2-(4'-thiazolyl)-benzimidazole. This and other 2-substituted benzimidazoles preparable from the N-phenyl-hydroxy-amidines of this invention are highly efficacious in the treatment and prevention of helminthiasis in animals such as sheep, goats, cattle, horses and swine. When employed as anthelmintic agents, they are orally administered to the animals in the form of a drench or a bolus, or admixed with the feed of the animals.

The following examples are given for the purpose of illustration and not by way of limitation:

*Example 1*

To a solution of 1.05 g. of hydroxylamine hydrochloride in 9 ml. of water there is added 2.39 g. (0.01 mole) of N-phenyl(thiazole-4-amidine)hydrochloride, followed by 9 ml. of ethanol. 840 mg. of sodium bicarbonate is then added and the reaction mixture stirred for 10–15 minutes in an oil bath at a temperature of 95° C. The solution is then cooled to room temperature and an additional 840 mg. of sodium bicarbonate is added. Following the second addition the reaction mixture is stirred at 20–25° C. for 10 minutes. It is then diluted with 20 ml. of water and extracted with 3 x 25 ml. of chloroform. The chloroform extracts are combined, washed with 10 ml. of water and dried over magnesium sulfate. The organic solvent solution is filtered and concentrated to dryness in vacuo. The oily residue is triturated with petroleum ether in order to crystallize the N-phenyl (thiazole-4-hydroxyamidine). This amidine is recovered by filtration and dried in vacuo. It is recrystallized from water to give substantially pure material, M.P. 142–145° C.

When N-phenyl(thiazole-2-amidine)hydrochloride is treated with hydroxylamine according to the above process, N-phenyl(thiazole-2-hydroxyamidine) is produced. The N-phenyl-hydroxyamidine derivatives of other five-membered heterocyclic compounds containing nitrogen and sulfur are produced in a similar fashion by intimately contacting the corresponding N-phenylamidine derivative with hydroxylamine. In this way N-phenyl(isothiazole-4-hydroxyamidine), N - phenyl(1,2,3-thiadiazole-4-hydroxyamidine), N-phenyl(4-methylthiazole-2-hydroxyamidine) and N-3-methoxyphenyl(thiazole-4-hydroxyamidine) are produced.

When N - 3 - methylphenyl(thiazole-4-amidine)hydrochloride, N-3-phenoxyphenyl(thiazole-4-amidine)hydrochloride, N - 3-methylthiophenyl(thiazole-4-amidine)hydrochloride, or N - 3 - phenylthiophenyl(thiazole-4-amidine)hydrochloride is used in the above process in place of N-phenyl(thiazole-4-amidine)hydrochloride, there is obtained N-p-tolyl(thiazole-4-hydroxyamidine), N-3-phenoxyphenyl(thiazole-4-hydroxyamidine), N - 3-methylthiophenyl(thiazole-4-hydroxyamidine), or N-3-phenylthiophenyl(thiazole-4-hydroxyamidine), respectively.

*Example 2*

To a solution of 2.1 g. of hydroxylamine hydrochloride in 20 ml. of water is added 6.32 g. of N-p-biphenylyl-(thiazole-4-amidine)hydrochloride, followed by 20 ml. of tetrahydrofuran. Sodium bicarbonate (1.70 g.) is then added and the mixture stirred for 5 minutes at 95° C. The solution is cooled to 25° C. and an additional 1.7 g. of sodium bicarbonate is added. The reaction mixture is stirred an additional 15 minutes at 20–25° C., diluted with water and the product, N-p-biphenylyl-(thiazole-4-hydroxy-amidine), is isolated by extraction with chloroform.

When the above process is carried out and N-p-(4'-fluorobiphenylyl)(thiazole-4-amidine)hydrochloride, N-3-fluorophenyl(thiazole-4-amidine)hydrochloride, N-3,4-dichlorophenyl(thiazole-4-amidine)hydrochloride, or N-3-(2'-thienylphenyl)(thiazole-4-amidine)hydrochloride, is used in place of N-p-biphenylyl-(thiazole-4-amidine)hydrochloride, there is obtained N-p-(4'-fluorobiphenylyl)(thiazole-4-hydroxyamidine), N-3-fluorophenyl(thiazole-4-hydroxyamidine), N-3,4-dichlorophenyl(thiazole-4-hydroxyamidine), or N-3(2'-thienylphenyl)(thiazole-4-hydroxyamidine), respectively.

*Example 3*

This example is for the purpose of disclosing methods generally applicable in preparing active anthelmintics from the N-hydroxyamidines of this invention.

42 mg. of methane sulfonyl chloride in 1 ml. of benzene is added dropwise at 5° C. to a mixture of 80 mg. of N-phenyl(thiazole-4-hydroxyamidine) in 3 ml. of benzene and 0.2 ml. of pyridine. The resulting mixture is allowed to stand at room temperature for 15 hours and the solid pyridine hydrochloride then removed by filtration. The filtrate is concentrated to dryness in vacuo and the resulting residue treated with 5 ml. of an 0.1 N sodium carbonate solution. The resulting solid is separated and dissolved in 2 ml. of 0.1 N hydrochloric acid. The acid solution is filtered and the pH then adjusted to 6 with ammonium hydroxide. 2 - (4' - thiazolyl)-benzimidazole precipitates and is recovered by filtration, washing with water and drying in vacuo.

By similar treatment of the appropriate N-phenylhydroxyamidine compound produced as described in Example 2, there are produced 2-(2'-thiazolyl)-benzimidazole, 2 - (4' - isothiazolyl) - benzimidazole, 2-[4'(1',2',3'-thiadiazolyl)]-benzimidazole and 2-(4'-thiazolyl)-5-methoxy benzimidazole.

*Example 4*

The starting materials for the process of this invention are prepared from heterocyclic carboxylic acids by the procedure exemplified below:

60 g. of dry thiazole-4-carboxylic acid is added with stirring to 146 ml. of thionyl chloride. The reaction mixture is heated under gentle reflux for 2 hours. The excess thionyl chloride is then removed in vacuo, and 300 ml. of petroleum ether added slowly to the oily residue. The resulting mixture which contains precipitated thiazole-4-carboxylic acid chloride is cooled to 15° C., and the desired acid chloride removed by filtration. It is washed with cold petroleum ether and dried in vacuo, M.P. 85° C.

Approximately 14 g. of dry ammonia gas is added to a solution of 40 g. of thiazole-4-carboxylic acid chloride in 300 ml. of benzene over a period of 1 hour. The temperature is maintained at 30–35° C. The reaction mixture is then aged for 1 hour at 25° C. The solid product is removed by filtration and dried in vacuo. It is suspended in 130 ml. of cold water to dissolve ammonium chloride. The suspension is filtered and washed with cold water. The wet solid is then dissolved in 150 ml. of boiling water, the solution treated with decolorizing charcoal, filtered while hot and cooled to 5° C. The crystalline thiazole-4-carboxamide thus obtained is recovered by filtration and dried in vacuo at 40° C., M.P. 152–153° C.

24 g. of thiazole - 4-carboxamide and 20 g. of phosphorus pentoxide are intimately mixed in a round bottomed flask fitted with a short condenser and a receiver. The mixture is heated in an oil bath at a bath temperature of 200–220° C. for 20 minutes. The mixture is then distilled, 4-cyanothiazole distilling at 100–120° C./20 mm. The product is purified by sublimation (65° C./30 mm.), M.P. 60–61° C.

3.0 g. of 4-cyanothiazole (0.0275 mole) is added to 2.75 g. of aniline at 25° C., and 3.65 g. (0.0275 mole) of powdered aluminum chloride gradually stirred into the mixture over a period of 20 minutes. An exothermic reaction ensues and the temperature of the reaction mixture rises to about 120–130° C. After the addition of aluminum chloride is complete, the reaction mixture is heated at 180° C. for 20 minutes. It is then cooled to room temperature and the reaction mass dissolved in 100 ml. of 75% ethanol. The resulting solution is made strongly alkaline with 25% aqueous sodium hydroxide solution and then extracted with 3 x 70 ml. of chloroform. The chloroform extracts are combined, washed with water and dried over potassium carbonate. The chloroform solution is filtered and treated with 1.0 g. of decolorizing charcoal. The charcoal is removed by filtration and charcoal treatment repeated once more. The resulting yellow solution is concentrated to dryness in vacuo and the residue dissolved in 25 ml. of isopropanol. The pH of the solution is adjusted to 1–1.5 with isopropanolic hydrogen chloride and 500 ml. of ether added slowly, with stirring, at about 10° C. After addition of ether is complete, the mixture is stirred for 1 hour and the resulting solid removed by filtration. The solid is washed with small portions of ether and petroleum ether and then dried in vacuo at 25° C. to give 5.7 g. of N-phenyl(thiazole-4-amidine)hydrochloride, M.P. 255–257° C.

When 2-cyanothiazole is employed in the above process, there is obtained N-phenyl(thiazole-2-amidine)hydrochloride. The N-phenylamidine derivatives of other five-membered heterocyclic compounds containing nitrogen and sulfur, such as N-phenyl(isothiazole-4-amidine)hydrochloride, N-phenyl(4-methylthiazole-2-amidine)hydrochloride and N-phenyl(1,2,3-thiadiazole-4-amidine)hydrochloride, are obtained in a similar fashion by reacting the appropriate cyano-heterocycle, such as 4-cyano-isothiazole, 2-cyano-4-methylthiazole and 4-cyano-1,2,3-thiadiazole, with equimolar amounts of aniline and aluminum chloride as described above. When there is desired an N-phenylamidine substituted at the 3- and/or 4-position with the substituents hereinabove defined as $R_1$ and $R_2$, an appropriate 3- and/or 4-substituted aniline should be used in place of aniline in the above process.

Any departure from the above description which conforms to the present invention is intended to be included within the scope of the claims.

We claim:

1. A compound having the formula

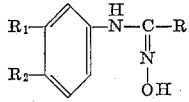

where R represents a five-membered heterocyclic radical selected from the class consisting of thiazolyl, thiadiazolyl and isothiazolyl rings, the point of attachment of said heterocyclic ring to the amidine carbon atom being at a carbon atom of said heterocyclic ring, and $R_1$ and $R_2$ are selected from the class consisting of hydrogen, lower alkyl, loweralkoxy, loweralkylthio, phenoxy, phenylthio, halo, phenyl, halophenyl and thienyl, provided that when both $R_1$ and $R_2$ are other than halo, at least one of $R_1$ and $R_2$ is hydrogen.

2. N-phenyl(thiazole-4-hydroxyamidine).
3. N-phenyl(thiazole-2-hydroxyamidine).
4. N-p-biphenylyl-(thiazole-4-hydroxyamidine).
5. The process for making a compound of the formula

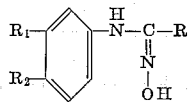

where R is a five-membered heterocyclic radical selected from the class consisting of thiazolyl, thiadiazolyl and isothiazolyl rings, the point of attachment of said heterocyclic ring to the amidine carbon atom being at a carbon atom of said heterocyclic ring, and $R_1$ and $R_2$ are selected from the class consisting of hydrogen, lower alkyl, loweralkoxy, loweralkylthio, phenoxy, phenylthio, halo, phenyl, halophenyl and thienyl, provided that when both $R_1$ and $R_2$ are other than halo, at least one of $R_1$ and $R_2$ is hydrogen, that comprises intimately contacting hydroxylamine with a compound of the formula

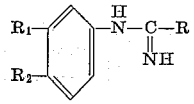

where R, $R_1$ and $R_2$ are as previously defined.

6. The process for preparing N-phenyl(thiazole-4-hydroxyamidine) that comprises intimately contacting N-phenyl(thiazole-4-amidine) with hydroxylamine.

7. The process for preparing N-phenyl(thiazole-2-hydroxylamidine) that comprises intimately contacting N-phenyl(thiazole-2-amidine) with hydroxylamine.

8. The process for preparing N-p-biphenylyl-(thiazole-4-hydroxyamidine) that comprises intimately contacting N-p-biphenylyl(thiazole-4-amidine) with hydroxylamine.

No references cited.

NICHOLAS S. RIZZO, *Primary Examiner.*